(12) United States Patent
Jiang et al.

(10) Patent No.: US 9,897,797 B2
(45) Date of Patent: Feb. 20, 2018

(54) DISPLAY PANEL AND ELECTRONIC DEVICE

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventors: Yurui Jiang, Guangdong (CN); De-Jiun Li, Guangdong (CN); Hongqing Cui, Guangdong (CN)

(73) Assignees: Shenzhen China Star Optoelectronics Technology Co., Ltd, Shenzhen, Guangdong (CN); Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 251 days.

(21) Appl. No.: 14/783,414

(22) PCT Filed: Jul. 30, 2015

(86) PCT No.: PCT/CN2015/085538
§ 371 (c)(1),
(2) Date: Oct. 8, 2015

(87) PCT Pub. No.: WO2017/008339
PCT Pub. Date: Jan. 19, 2017

(65) Prior Publication Data
US 2017/0160539 A1 Jun. 8, 2017

(30) Foreign Application Priority Data

Jul. 15, 2015 (CN) .......................... 2015 1 0416772

(51) Int. Cl.
F21V 8/00 (2006.01)
G02B 26/08 (2006.01)
G02F 1/1368 (2006.01)

(52) U.S. Cl.
CPC ....... *G02B 26/0833* (2013.01); *G02B 6/0053* (2013.01); *G02B 6/0055* (2013.01); *G02F 1/1368* (2013.01)

(58) Field of Classification Search
CPC .............. G02B 26/0833; G02B 6/0053; G02B 6/0055; G02B 6/1368; G02F 1/1368
See application file for complete search history.

(56) References Cited

U.S. PATENT DOCUMENTS

2001/0002964 A1    6/2001   Song et al.

FOREIGN PATENT DOCUMENTS

CN    1690793      * 11/2005
CN    1690793 A      11/2005
(Continued)

*Primary Examiner* — Thomas M Sember
(74) *Attorney, Agent, or Firm* — Andrew C. Cheng

(57) ABSTRACT

The present invention provides a display panel, comprising a brightness enhancement film, a light guide plate and a backlight source, and the brightness enhancement film is located to stack with the light guide plate, and the backlight source is located at a lateral side of the light guide plate, wherein the display panel further comprises a MEMS reflective plate located at a bottom of the light guide plate, and the MEMS reflective plate comprises a control substrate and reflective units, and the control substrate is employed to control working statuses of the reflective units, and the reflective unit comprises a driving unit located at the control substrate and a reflective sheet rotatably connected to the driving unit, and the driving unit is employed to drive the reflective sheet to rotate.

14 Claims, 2 Drawing Sheets

(56) References Cited

FOREIGN PATENT DOCUMENTS

| CN | 101194204 A | 6/2008 |
| CN | 101424768 A | 5/2009 |
| CN | 101542325 A | 9/2009 |
| JP | 2001311946 A | 9/2001 |

\* cited by examiner

DISPLAY PANEL AND ELECTRONIC DEVICE

CROSS REFERENCE

This application claims the priority of Chinese Patent Application No. 201510416772.8, entitled "Display panel and electronic device", filed on Jul. 15, 2015, the disclosure of which is incorporated herein by reference in its entirety.

FIELD OF THE INVENTION

The present invention relates to a display technology field, and more particularly to a display panel and an electronic device.

BACKGROUND OF THE INVENTION

The LCD (Liquid Crystal Display) possesses advantages of thin body, power saving and no radiation to be widely used in many application scope. Most of the liquid crystal displays on the present market are back light type liquid crystal displays, which comprise a liquid crystal display panel and a back light module. The working principle of the liquid crystal display panel is to locate liquid crystal molecules between two parallel glass substrates, and a plurality of vertical and horizontal tiny electrical wires are between the two glass substrates. The light of back light module is reflected to generate images by applying driving voltages to control whether the liquid crystal molecules to be changed directions.

At present, the main structure of the LCD panel on the market is shown in FIG. 1, and comprises a backlight source 1, a light guide plate 2, a brightness enhancement film 3, a lower polarizer 4, a TFT substrate 5, a liquid crystal layer 6, a color filter 7, an upper polarizer 8 and a reflective sheet 9. The voltage applied to the liquid crystal layer is controlled for manipulating the rotations of the liquid crystal molecules. Thus, a small angle change occurs to the polarization direction of the linearly polarized light generated with the light emitted by the backlight passing through the lower polarizer. The light passes through the color filter and forms color of various colors. Because the polarization direction of the light and the transmission axis of the upper polarizer have different included angles, the intensity of the emitting light can be controlled to form the display image that we want.

However, in prior arts, the liquid crystal itself in the liquid crystal display does not illuminate and has to rely on the backlight to provide the light source. With some reasons that the orientations of the liquid crystal molecules cannot perfectly satisfy the design requirements, as showing the black image, the pixels cannot be completely off, and some light still exiting out from the panel, which results in that the contrast cannot be reduced and cannot satisfy the requirement of high quality from the consumers.

SUMMARY OF THE INVENTION

An objective of the present invention is to provide a display panel using MEMS to raise the dynamic contrast of the display panel for enhancing display effect.

Another objective of the present invention is to provide an electronic device using the aforesaid display panel.

For realizing the aforesaid objective, the technical solution provided by the embodiments of the present invention is:

the present invention discloses a display panel, comprising a brightness enhancement film, a light guide plate and a backlight source, and the brightness enhancement film is located to stack with the light guide plate, and the backlight source is located at a lateral side of the light guide plate, wherein the display panel further comprises a MEMS reflective plate located at a bottom of the light guide plate, and the MEMS reflective plate comprises a control substrate and reflective units, and the control substrate is employed to control working statuses of the reflective units, and the reflective unit comprises a driving unit located at the control substrate and a reflective sheet rotatably connected to the driving unit, and the driving unit is employed to drive the reflective sheet to rotate.

A range of a rotation azimuth of the reflective sheet is 0-360°.

A spherical pair is located between the reflective sheet and the driving unit and the spherical pair comprises a spherical pair shell body structure and a spherical pair inner ball head, and the spherical pair inner ball head is movably installed in the inner surface of the spherical pair shell body structure.

The reflective sheet is a white reflective sheet or a silver reflective sheet, of which a reflective layer is coated on a surface thereof.

The reflective sheet is a white reflective sheet or a silver reflective sheet, of which a reflective layer is coated on a surface thereof.

The display panel further comprises common electrode lines and a plurality of pixel areas, and the pixel area further comprises a thin film transistor, a drain of the thin film transistor is coupled to an input end of the driving unit and an output end of the driving unit is coupled to the common electrode line.

Each of the pixel areas comprises at least one of the reflective units.

The backlight source is a white LED light source or a RGB three primary colors LED light source.

The present invention further provides an electronic device, comprising a display panel, and the display panel comprises a brightness enhancement film, a light guide plate and a backlight source, and the brightness enhancement film is located to stack with the light guide plate, and the backlight source is located at a lateral side of the light guide plate, and the display panel further comprises a MEMS reflective plate located at a bottom of the light guide plate, and the MEMS reflective plate comprises a control substrate and reflective units, and the control substrate is employed to control working statuses of the reflective units, and the reflective unit comprises a driving unit located at the control substrate and a reflective sheet rotatably connected to the driving unit, and the driving unit is employed to drive the reflective sheet to rotate.

A range of a rotation azimuth of the reflective sheet is 0-360°.

A spherical pair is located between the reflective sheet and the driving unit, and the spherical pair comprises a spherical pair shell body structure and a spherical pair inner ball head, and the spherical pair inner ball head is movably installed in the inner surface of the spherical pair shell body structure.

The reflective sheet is a white reflective sheet or a silver reflective sheet, of which a reflective layer is coated on a surface thereof.

The reflective sheet is a white reflective sheet or a silver reflective sheet, of which a reflective layer is coated on a surface thereof.

The display panel further comprises common electrode lines and a plurality of pixel areas, and the pixel area further comprises a thin film transistor, a drain of the thin film transistor is coupled to an input end of the driving unit and an output end of the driving unit is coupled to the common electrode line.

Each of the pixel areas comprises at least one of the reflective units.

The backlight source is a white LED light source or a RGB three primary colors LED light source.

The embodiments of the present invention have advantages or benefits:

By the way of locating rotating reflective sheet in each pixel area according to the present invention, the light in the pixel off area is reflected to the adjacent pixel on area for realizing the control to the backlight in each pixel area for achieving the objective of promoting the dynamic contrast of each pixel area and thus, promoting the display effect of the display panel.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
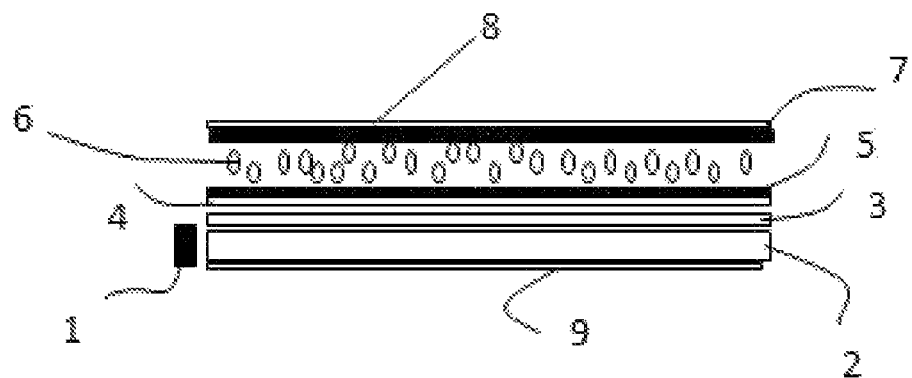
FIG. 1 is a structural diagram of a LED panel structure according to prior art.
Figure 2:
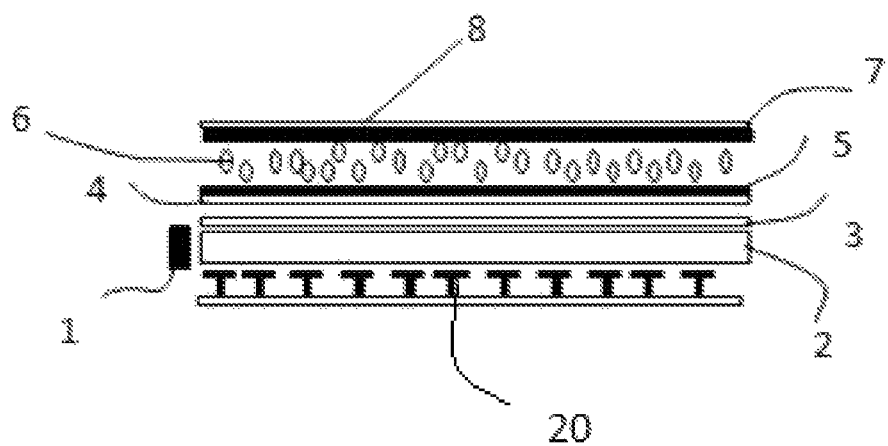
FIG. 2 is a structural diagram of a LED panel structure according to the present invention.

Please refer to FIG. 2. The embodiment of the present invention provides a display panel, comprising an upper polarizer 8, a color filter 7, a liquid crystal layer 6, a TFT substrate 5, a lower polarizer 4, a brightness enhancement film 3, a light guide plate 2, MEMS reflective plates 20. A backlight source 1 is located at the lateral side of the light guide plate 2. The MEMS reflective plates 20 are located at the bottom of the light guide plate 2, and the MEMS reflective plate 20 comprises a control substrate 11 and a reflective unit (not numbered), and the reflective unit comprises a driving unit 12 located at the control substrate 11, and a reflective sheet 10 rotatably connected to the driving unit 12. The driving unit 12 is employed to drive the reflective sheet 10 to rotate and to change the reflecting direction of the light.

Figure 3:
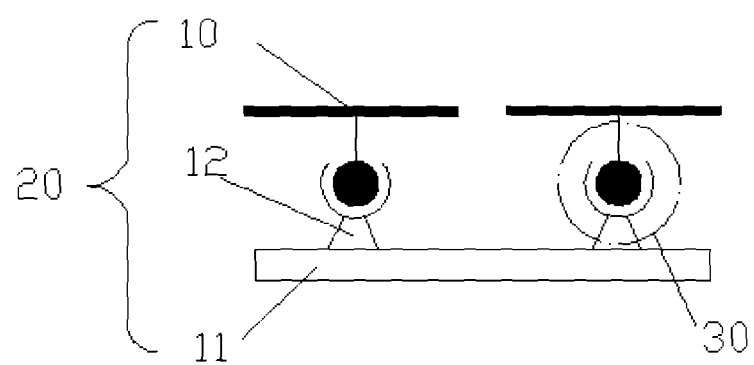
FIG. 3 is a structural diagram of a MEMS reflective plate.

Furthermore, referring to FIG. 3, a spherical pair 30 is located between the reflective sheet 10 and the driving unit 12, and the spherical pair comprises a spherical pair shell body structure and a spherical pair inner ball head, and the spherical pair inner ball head is movably installed in the inner surface of the spherical pair shell body structure. The spherical pair has three free degrees and can arbitrarily rotate in the space, which increases the rotation range of the reflective sheet 10. Particularly, with the connection of the spherical pair, it can be ensured that a range of a rotation azimuth of the reflective sheet 10 is 0-360°.

Furthermore, the display panel 100 comprises a plurality of pixel areas. One pixel area refers to one unit capable of congruously controlling the brightness. Each pixel area comprises a plurality of pixels. Therefore, the reflected light in the pixel area is provided by at least one reflective unit. In other words, by using the reflective unit to control the reflected light of various pixel areas, for example, as the pixels i the pixel area corresponded with the reflective unit is off, the driving unit 12 can drive the reflective sheet to rotate to reflect the light in the pixel area to the adjacent pixel area which the pixel is on. Thereby, it does not raise the output coefficient of the light energy but the power consumption of the display panel is also reduced. Moreover, the dynamic contrast of the pixel area is raised to promote the display effect.

Furthermore, the display panel 100 further comprises common electrode lines (not shown) and a plurality of data lines (not shown) and data lines which are intersect with one another, a thin film transistor. The gate means the whole of the gate electrodes and the gate layouts (also called gate line, gate signal line, scan line, scan signal line) or a portion of these. The gate electrode means the part of conductive film which sandwiches the gate isolation film and overlaps with the semiconductor forming the channel area. Besides, a part of the gate electrode sometimes sandwiches the stacking gate isolation film and LDD (Lightly Doped Drain) area or source area (or drain area) inbetween. The gate layout means the wire arrangement employed for connecting the gate electrodes of respective transistors, the wire arrangement employed for connecting the gate electrodes of respective pixels, or the wire arrangement employed for connecting the gate electrodes or other wires.

Besides, the part (area, conductive film, wire) formed with the same material of the gate electrode and formed to be the same island connected with the gate electrode also belongs to the gate electrode. Similarly, the part (area, conductive film, wire) formed with the same material of the gate layout and formed to be the same island connected with the gate layout also belongs to the gate layout. Strictly speaking, sometimes, these parts (area, conductive film, wire) do not overlap with the channel area, or do not have function of connecting other gate electrodes. However, according to the manufacture condition, there are the parts (area, conductive film, wire) formed with the same material of the gate electrode or the gate layout and formed to be the same island connected with the gate electrode or the gate layout. Therefore, such parts (area, conductive film, wire) also belong to the gate electrode or the gate layout.

The gate of the thin film transistor is coupled to the gate line, and the source is coupled to the data line. The input end of the driving unit 12 is coupled to the drain of the thin film transistor, and the output end is coupled to the common electrode line. By providing the driving signal to the driving unit 11 through the thin film transistor, the display contents of the respective pixel areas can be independently controlled.

Furthermore, the color filter 7 is employed to achieve the colorization of the image after the light emitted from the backlight module passes through the color filter 7. The color filter 7 comprises a RGB color film layer (i.e. red color film, green color film and blue color film) (not shown).

Preferably, the reflective sheet 10 is a reflective sheet having high reflectivity, and employed to raise the face brightness of the display panel 100 in a certain light source output. The reflective sheet 10 is a white reflective sheet or a silver reflective sheet, of which a reflective layer is coated on a surface thereof. The material of the reflective layer can utilize the reflective material of which the reflectivity is above 50% to promote the reflective result.

Furthermore, as being the light sources, the Cold Cathode Fluorescent Lamp or LED (light emitting diode) can be illustrated. AS being the LEDs, the white LED can be uses. Alternatively, the combination of LEDs of various colors can be illustrated (such as white, red, blue, green, bluish green, amaranth, yellow). By using the OLEDs, the wavelength peak is sharp and thus the purity of the color can be raised. Under condition of utilizing the side light type, the light guide plate is arranged to achieve the uniform area light source.

Furthermore, the light guide plate 2 utilizes Polymethylmethacrylate (PMMA)/Polycarbonate (PC) to convert the line light source into the area light source.

The present invention further provides an electronic device using the aforesaid display panel. The electronic device can be a clock with the display panel, a watch having the display panel, a personal computer, a liquid crystal TV, a view finding or a monitor direct recording video tape, a navigator, a pager, a electron notebook, a calculator, a text processor, a work state, a video telephone, a PO terminal and etc.

Above are embodiments of the present invention, which does not limit the scope of the present invention. Any modifications, equivalent replacements or improvements within the spirit and principles of the embodiment described above should be covered by the protected scope of the invention.

What is claimed is:

1. A display panel, comprising a brightness enhancement film, a light guide plate and a backlight source, and the brightness enhancement film is located to stack with the light guide plate, and the backlight source is located at a lateral side of the light guide plate, wherein the display panel further comprises a MEMS reflective plate located at a bottom of the light guide plate, and the MEMS reflective plate comprises a control substrate and reflective units, and the control substrate is employed to control working statuses of the reflective units, and the reflective unit comprises a driving unit located at the control substrate and a reflective sheet rotatably connected to the driving unit, and the driving unit is employed to drive the reflective sheet to rotate, wherein a range of a rotation azimuth of the reflective sheet is 0-360°.

2. The display panel according to claim 1, wherein a spherical pair is located between the reflective sheet and the driving unit, and the spherical pair comprises a spherical pair shell body structure and a spherical pair inner ball head, and the spherical pair inner ball head is movably installed in the inner surface of the spherical pair shell body structure.

3. The display panel according to claim 2, wherein the reflective sheet is a white reflective sheet or a silver reflective sheet, of which a reflective layer is coated on a surface thereof.

4. The display panel according to claim 1, wherein the reflective sheet is a white reflective sheet or a silver reflective sheet, of which a reflective layer is coated on a surface thereof.

5. The display panel according to claim 4, wherein each of the pixel areas comprises at least one of the reflective units.

6. The display panel according to claim 1, wherein the display panel further comprises common electrode lines and a plurality of pixel areas, and the pixel area further comprises a thin film transistor, a drain of the thin film transistor is coupled to an input end of the driving unit and an output end of the driving unit is coupled to the common electrode line.

7. The display panel according to claim 1, wherein the backlight source is a white LED light source or a RGB three primary colors LED light source.

8. The electronic device according to claim 1, wherein a spherical pair is located between the reflective sheet and the driving unit, and the spherical pair comprises a spherical pair shell body structure and a spherical pair inner ball head, and the spherical pair inner ball head is movably installed in the inner surface of the spherical pair shell body structure.

9. The electronic device according to claim 8, wherein the reflective sheet is a white reflective sheet or a silver reflective sheet, of which a reflective layer is coated on a surface thereof.

10. The electronic device according to claim 1, wherein the reflective sheet is a white reflective sheet or a silver reflective sheet, of which a reflective layer is coated on a surface thereof.

11. An electronic device, comprising a display panel, and the display panel comprises a brightness enhancement film, a light guide plate and a backlight source, and the brightness enhancement film is located to stack with the light guide plate, and the backlight source is located at a lateral side of the light guide plate, and the display panel further comprises a MEMS reflective plate located at a bottom of the light guide plate, and the MEMS reflective plate comprises a control substrate and reflective units, and the control substrate is employed to control working statuses of the reflective units, and the reflective unit comprises a driving unit located at the control substrate and a reflective sheet rotatably connected to the driving unit, and the driving unit is employed to drive the reflective sheet to rotate, wherein a range of a rotation azimuth of the reflective sheet is 0-360°.

12. The electronic device according to claim 11, wherein the display panel further comprises common electrode lines and a plurality of pixel areas, and the pixel area further comprises a thin film transistor, a drain of the thin film transistor is coupled to an input end of the driving unit and an output end of the driving unit is coupled to the common electrode line.

13. The electronic device according to claim 12, wherein each of the pixel areas comprises at least one of the reflective units.

14. The electronic device according to claim 11, wherein the backlight source is a white LED light source or a RGB three primary colors LED light source.

* * * * *